(12) United States Patent
Brown et al.

(10) Patent No.: US 10,534,745 B2
(45) Date of Patent: Jan. 14, 2020

(54) METHODS FOR ENABLING DIRECT MEMORY ACCESS (DMA) CAPABLE DEVICES FOR REMOTE DMA (RDMA) USAGE AND DEVICES THEREOF

(71) Applicant: NetApp, Inc., Sunnyvale, CA (US)

(72) Inventors: Peter Brown, Raleigh, NC (US); Fan Yang, Cary, NC (US); Andrew Boyer, Durham, NC (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 16/412,794

(22) Filed: May 15, 2019

(65) Prior Publication Data
US 2019/0266124 A1  Aug. 29, 2019

Related U.S. Application Data

(63) Continuation of application No. 14/928,203, filed on Oct. 30, 2015, now Pat. No. 10,331,613.

(51) Int. Cl.
*G06F 15/17* (2006.01)
*G06F 15/173* (2006.01)
*H04L 29/08* (2006.01)
*H04L 12/26* (2006.01)

(52) U.S. Cl.
CPC .... *G06F 15/17331* (2013.01); *H04L 43/0888* (2013.01); *H04L 67/1091* (2013.01); *H04L 67/1097* (2013.01)

(58) Field of Classification Search
CPC ........... G06F 15/17331; H04L 67/1097; H04L 67/1091; H04L 43/0888
See application file for complete search history.

(56) References Cited

U.S. PATENT DOCUMENTS

| | | | |
|---|---|---|---|
| 2011/0106905 A1* | 5/2011 | Frey | H04L 69/166 709/212 |
| 2015/0254458 A1* | 9/2015 | Hong | G06F 21/57 726/22 |

\* cited by examiner

*Primary Examiner* — Henry Tsai
*Assistant Examiner* — Christopher Daley
(74) *Attorney, Agent, or Firm* — Pepper Hamilton LLP

(57) ABSTRACT

Methods, non-transitory computer readable media and computing device that enabling direct memory access (DMA) capable devices for remote DMA (RDMA) are illustrated. With this technology, a first network message is inserted into a first location of a remote memory region of a computing device via DMA. The remote memory region is defined in an anchor record retrieved from a shared memory of the computing device. A local head pointer is synchronized, via DMA, with a remote head pointer stored by the computing device. The local and remote head pointers correspond to the first location of the remote memory region of the computing device. Following receipt of a DMA completion message, a notification message is sent, via DMA, to the computing device indicating that the network message has been transferred.

18 Claims, 12 Drawing Sheets

SEND and RECV Operations
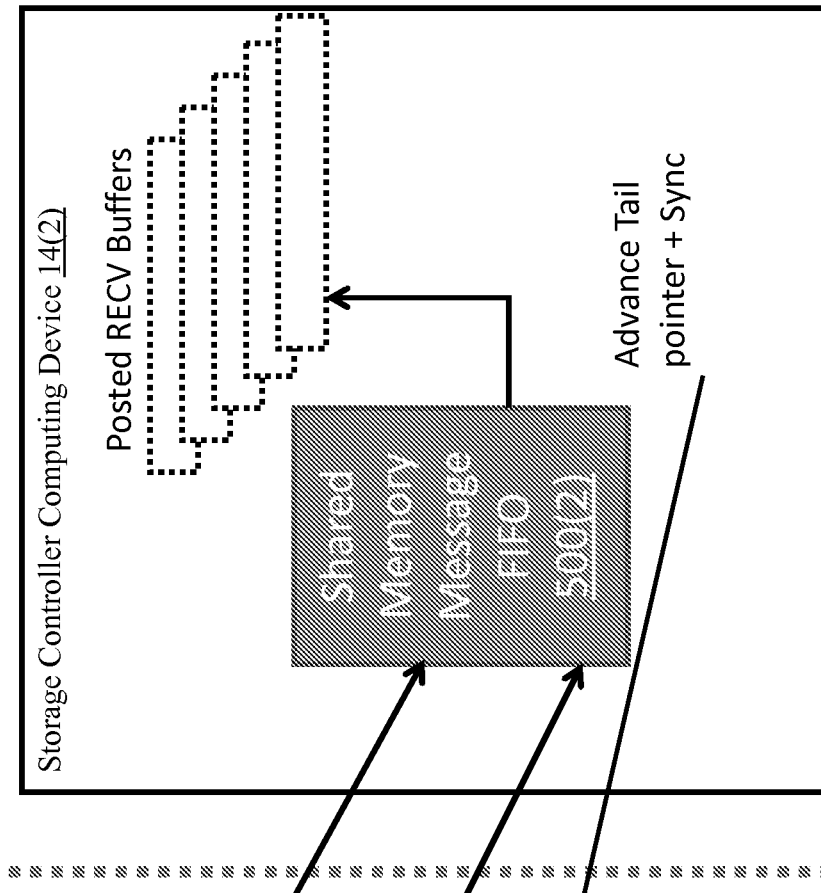
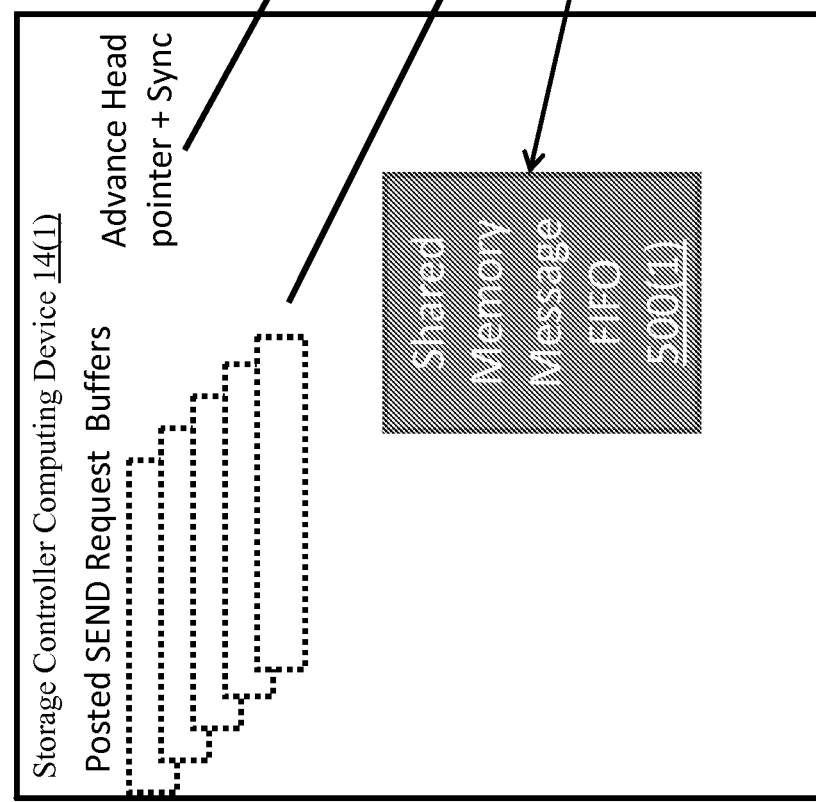
FIG. 7

METHODS FOR ENABLING DIRECT MEMORY ACCESS (DMA) CAPABLE DEVICES FOR REMOTE DMA (RDMA) USAGE AND DEVICES THEREOF

This application is a continuation of U.S. patent application Ser. No. 14/928,203, filed on Oct. 30, 2015, which is hereby incorporated by reference in its entirety.

FIELD

This technology relates to data transfers between computing devices, and more particularly to methods and devices for enabling direct memory access (DMA) capable devices for remote DMA (RDMA) usage.

BACKGROUND

Remote direct memory access (RDMA) is increasingly utilized to facilitate high throughput, low latency data transfers between computing devices. With RDMA, data can be written directly to, or read directly from, memory of another computing device using a network adapter and without using an operating system or requiring any context switches. Accordingly, data communications can occur relatively quickly and in parallel with other system operations. In one particular example, storage controller computing devices in storage networks can leverage RDMA to perform high speed, low latency data mirroring to facilitate high availability, although there are many other exemplary uses of RDMA in storage networks and other types of computing environments.

Currently, the OpenFabrics Alliance (OFA) distributes an OpenFabrics Enterprise Distribution (OFED) software stack that provides a standard software framework and application programming interface (API) that facilitates use of RDMA services by client applications. However, OFED only supports a limited number of transport protocols for communicating data using RDMA, such as InfiniBand, Internet Wide Area RDMA Protocol (iWARP), and RDMA Over Converged Ethernet (RoCE).

Accordingly, only certain specialized hardware RDMA capable devices configured to communicate according to the supported protocols can be used to provide RDMA services in combination with an OFED software stack. In particular, relatively generic DMA capable peripheral component interconnect (PCI) devices, such as non-transparent bridges or non-volatile memory (NVM), cannot be utilized in combination with the OFED stack without significant rewriting of existing RDMA client applications.

BRIEF DESCRIPTION OF THE DRAWINGS

FIG. 7 is a flow diagram of an exemplary method for processing work requests including requests to send and receive network messages to or from a peer one of the storage controller computing devices;

DETAILED DESCRIPTION

Figure 1:
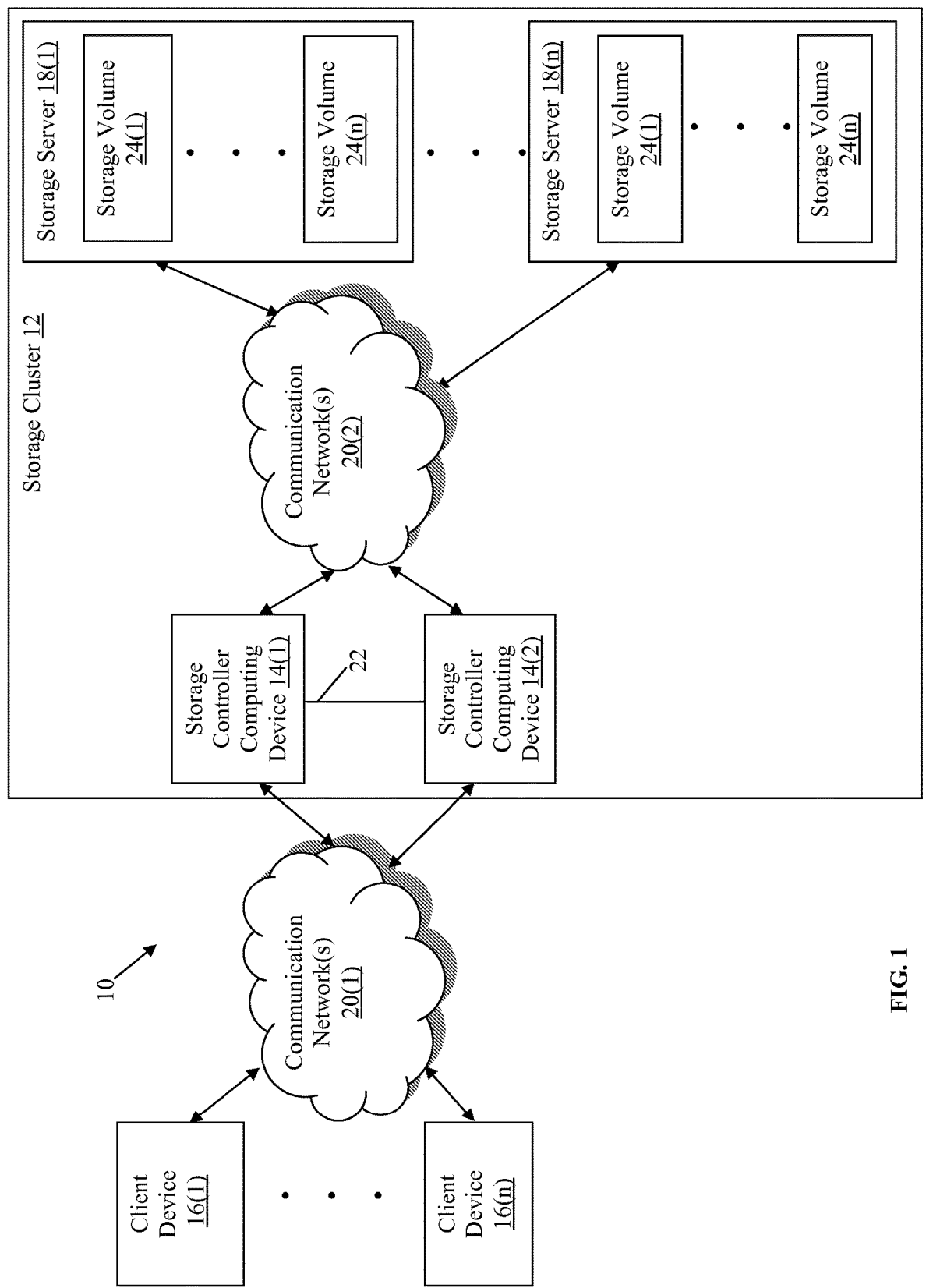
FIG. 1 is a block diagram of a network environment with an exemplary storage cluster including storage controller computing devices.

A network environment 10 including an example of a storage cluster 12 with exemplary peer storage controller computing devices 14(1) and 14(2) is illustrated in FIG. 1. The environment 10 in this example further includes client devices 16(1)-16(n), and storage servers 18(1)-18(n), although this environment 10 can include other numbers and types of systems, devices, components, and/or elements in other configurations. The client computing devices 16(1)-16(n) communicate with the storage controller computing devices 14(1) and 14(2) through the communication network(s) 20(1) and the storage controller computing devices 14(1) and 14(2) communicate with the storage servers 18(1)-18(n) through communication network(s) 20(2) in this example. This technology provides a number of advantages including methods, non-transitory computer readable media, and devices that facilitate remote direct memory access (RDMA) services without requiring specialized hardware or rewriting of existing client applications that leverage an OpenFabrics Enterprise Distribution (OFED) software stack and application programming interface (API).

The storage controller computing devices 14(1) and 14(2) in this example are coupled together via an interconnect 22 and operate on behalf of the client devices 16(1)-16(n) to store, retrieve, and/or manage files or other units of data stored by the storage servers 18(1)-18(n). Accordingly, the storage controller computing devices 14(1) and 14(2) manage and provision the storage volumes 24(1)-24(n) of the storage servers 18(1)-18(n), provide high availability for the data stored therein, and receive and respond to various read and write requests from the client devices 16(1)-16(n) directed to data stored in, or to be stored in, one or more of the storage volumes 24(1)-24(n) of the storage servers 18(1)-18(n).

Figure 2:
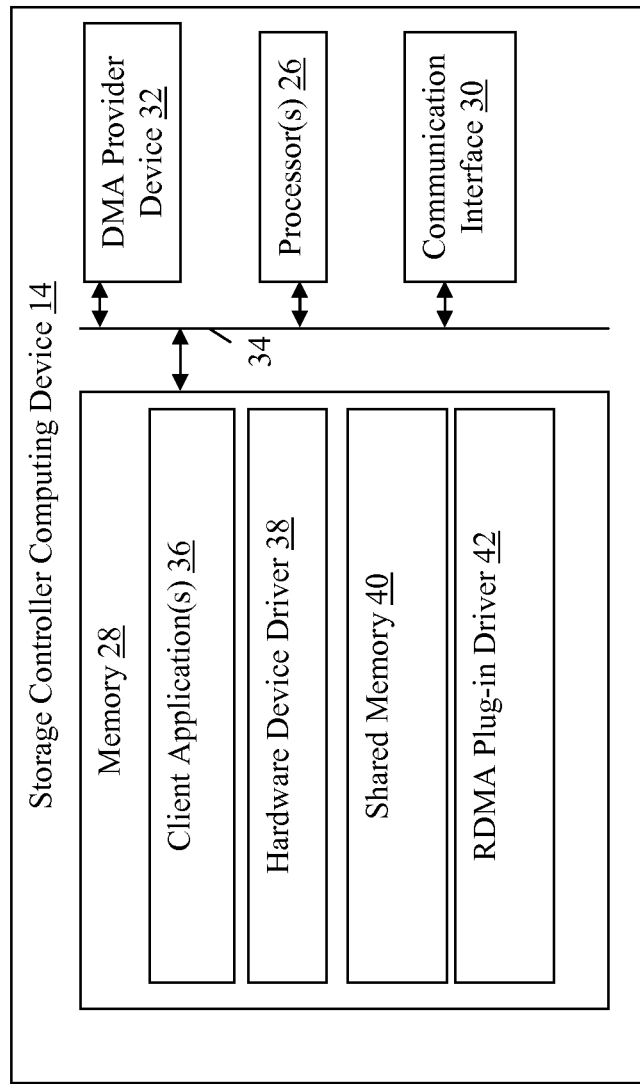
FIG. 2 is a block diagram of an exemplary one of the storage controller computing devices that includes an RDMA plug-in driver and a DMA provider device.

Referring to FIG. 2, a block diagram of one of the exemplary storage controller computing devices 14(1) and 14(2) is illustrated. In this example, the storage controller computing device 14 includes processor(s) 26, a memory 28, a communication interface 30, and a DMA provider device 32, which are coupled together by a bus 34 or other communication link.

The processor(s) 26 of the storage controller computing device 14 execute a program of stored instructions for one or more aspects of the this technology, as described and illustrated by way of the embodiments herein, although the processor(s) 26 could execute other numbers and types of programmed instructions. The processor(s) 26 in the storage controller computing device 14 may include one or more central processing units (CPUs) or general purpose processors with one or more processing cores, for example.

The memory 28 of the storage controller computing device 14 may include any of various forms of read only memory (ROM), random access memory (RAM), Flash memory, non-volatile or volatile memory, or the like, or a combination of such devices, for example. In this example, the memory includes client application(s) 36, a hardware device driver 38 for the DMA provider device 32, a shared memory 40, and an RDMA plug-in driver 42, although other types of applications or modules can also be included in other examples.

The client application(s) 36 can be relatively high level software applications that are configured to leverage RDMA services. In this example, the client application(s) 36 are configured to utilize an OFED API, also referred to herein as the "verbs API," in order to initiate RDMA operations. In one example, the client application(s) 36 can be configured to facilitate data mirroring by the storage controller computing devices 14(2) for high availability, although the client application(s) 36 can be configured to facilitate other operations within the storage cluster 12. The hardware device driver 38 provides an interface to the DMA provider device 32 that enables the RDMA plug-in driver 42 to utilize the DMA provider device 32 to move data via RDMA between the storage controller computing devices 14(1) and 14(2), as described and illustrated in more detail later.

The shared memory 40 is a memory region that includes an anchor record, a message FIFO memory region, and a memory protection table region, for example. The anchor record includes information regarding the shared memory 40 that can be retrieved by a peer one of the storage controller computing devices 14(1) or 14(2) and used to control and direct RDMA operations, as described and illustrated in more detail later. The message FIFO memory region of the shared memory 40 is used to receive network messages from the peer one of the storage controller computing devices 14(1) or 14(2) and the memory protection table region of the shared memory 40 defines memory locations or addresses that are available for use by the peer one of the storage controller computing devices 14(1) or 14(2) to perform RDMA operations, also as described and illustrated in more detail later.

The RDMA plug-in driver 42 enables the DMA provider device 32 for RDMA usage. In particular, the RDMA plug-in driver 42 implements RDMA services including direct data placement and retrieval and network messaging using the shared memory 40. The RDMA services implemented by the RDMA plug-in driver 42 are advantageously presented over the verbs API so that existing client application(s) 36 do not have to be rewritten in order to leverage the RDMA services. Additionally, the RDMA plug-in driver 42 advantageously uses the hardware device driver 38 and DMA provider device 32 to implement the RDMA services without requiring specialized hardware configured to use certain transport protocols. The operation of the RDMA plug-in driver 42 is described and illustrated in more detail later with reference to FIGS. 3-12.

The communication interface 30 of the storage controller computing device 14 in this example can include one or more network interface controllers (NICs) for operatively coupling and communicating between the storage controller computing devices 14(1) and 14(2), the client devices 16(1)-16(n), and the storage servers 18(1)-18(n), which are coupled together by the communication network(s) 20(1) and 20(2) and the interconnect 22, although other types and numbers of communication networks or systems with other types and numbers of connections and configurations to other devices and elements also can be used.

By way of example only, the communication network(s) 20(1) and/or 20(2) can use TCP/IP over Ethernet and industry-standard protocols, including NFS, CIFS, SOAP, XML, LDAP, and SNMP, although other types and numbers of communication networks, can be used. The communication network(s) 20(1) and 20(2) in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) 20(1) and 20(2) may also comprise any local area network and/or wide area network (e.g., Internet), although any other type of traffic network topologies may be used. In particular, the communication network 20(2) can be a direct connection or communication link to the storage servers 18(1)-18(n) and/or directly to the storage volumes 24(1)-24(n) when collocated on a same device with the storage controller computing devices 14(1) and 14(2), for example.

The DMA provider device 32 in this example can be any relatively primitive or generic DMA capable peripheral component interconnect (PCI) data mover hardware device that is not specialized and does not require any certain transport protocol in order to facilitate the movement of data via DMA. Some examples of the DMA provider device 32 includes non-transparent bridge devices or non-volatile memory (NVM), although other types of DMA provider devices can also be used. Accordingly, with this technology, the RDMA plug-in driver 42 receives commands via the verbs API and communicates with the hardware device driver 38 to carry out operations using the DMA provider device 32 in order to provide RDMA services to the client application(s) 36, as described and illustrated in more detail later.

Referring back to FIG. 1, each of the client devices 16(1)-16(n) in this example includes a processor, a memory, a communication interface, an input device, and a display device, which are coupled together by a bus or other link, although each of the client devices 16(1)-16(n) can have other types and numbers of components or other elements and other numbers and types of network devices could be used. The client devices 16(1)-16(n) may run interface applications that provide an interface to make requests for and send content and/or data to the storage controller computing devices 14(1)-14(n) via the communication network(s) 20(1), for example. Each of the client devices 16(1)-16(n) may be, for example, a conventional personal computer, a tablet computing device, a smart phone, a virtual machine running in a cloud, an application server hosting applications that utilize backend storage, or other processing and/or computing device, for example.

Each of the storage servers 18(1)-18(n) in this example includes storage volumes 24(1)-24(n), a processor, and a communication interface coupled together by a bus or other link. The storage volumes 24(1)-24(n) in this example can be hosted by conventional magnetic disks, solid-state drives (SSDs), or any other type of stable, non-volatile storage device suitable for storing large quantities of data. The storage servers 18(1)-18(n) may be organized into one or more volumes of Redundant Array of Inexpensive Disks (RAID), although other types and numbers of storage servers or volumes in other arrangements can also be used.

Although examples of the storage controller computing devices 14(1) and 14(2), client devices 16(1)-16(n), and storage servers 18(1)-18(n), are described and illustrated herein, it is to be understood that the devices and systems of the examples described herein are for exemplary purposes, as many variations of the specific hardware and software used to implement the examples are possible, as will be appreciated by those skilled in the relevant art(s). In addition, two or more computing systems or devices can be substituted for any one of the systems in any embodiment of the examples.

The examples also may be embodied as one or more non-transitory computer readable media having instructions stored thereon for one or more aspects of the present technology, as described and illustrated by way of the examples herein, which when executed by the processor, cause the processor to carry out the steps necessary to implement the methods of this technology, as described and illustrated with the examples herein.

Figure 3:
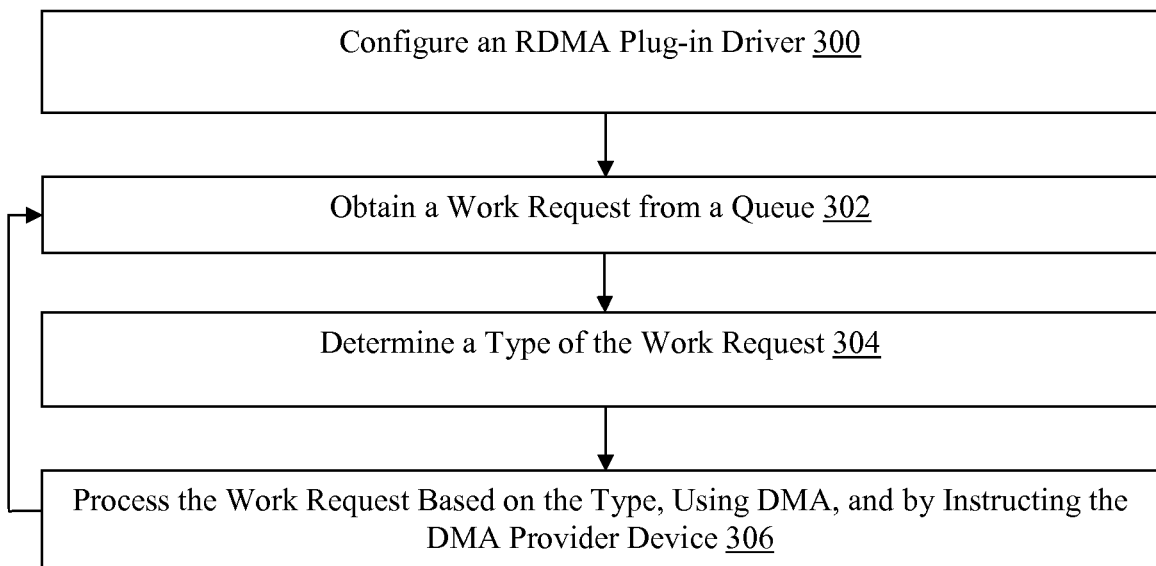
FIG. 3 is a flowchart of an exemplary method for enabling the DMA provider device for RDMA usage.

An exemplary method for enabling DMA capable devices for RDMA usage will now be described with reference to FIGS. 1-12. Referring more specifically to FIG. 3, an exemplary method for enabling, by the RDMA plug-in driver 42, the DMA provider device 32 for RDMA usage is illustrated. In step 300 in this example, the storage controller computing device 14(1) configures the RDMA plug-in driver 42 to facilitate DMA transfers between the storage controller computing devices 14(1) and 14(2). In this example, the storage controller computing devices 14(1) and 14(2) are peers that communicate over the high availability interconnect 22 in order to perform high speed data mirroring, although this technology can be used by other types of devices or in other contexts or computing environments.

Figure 4:
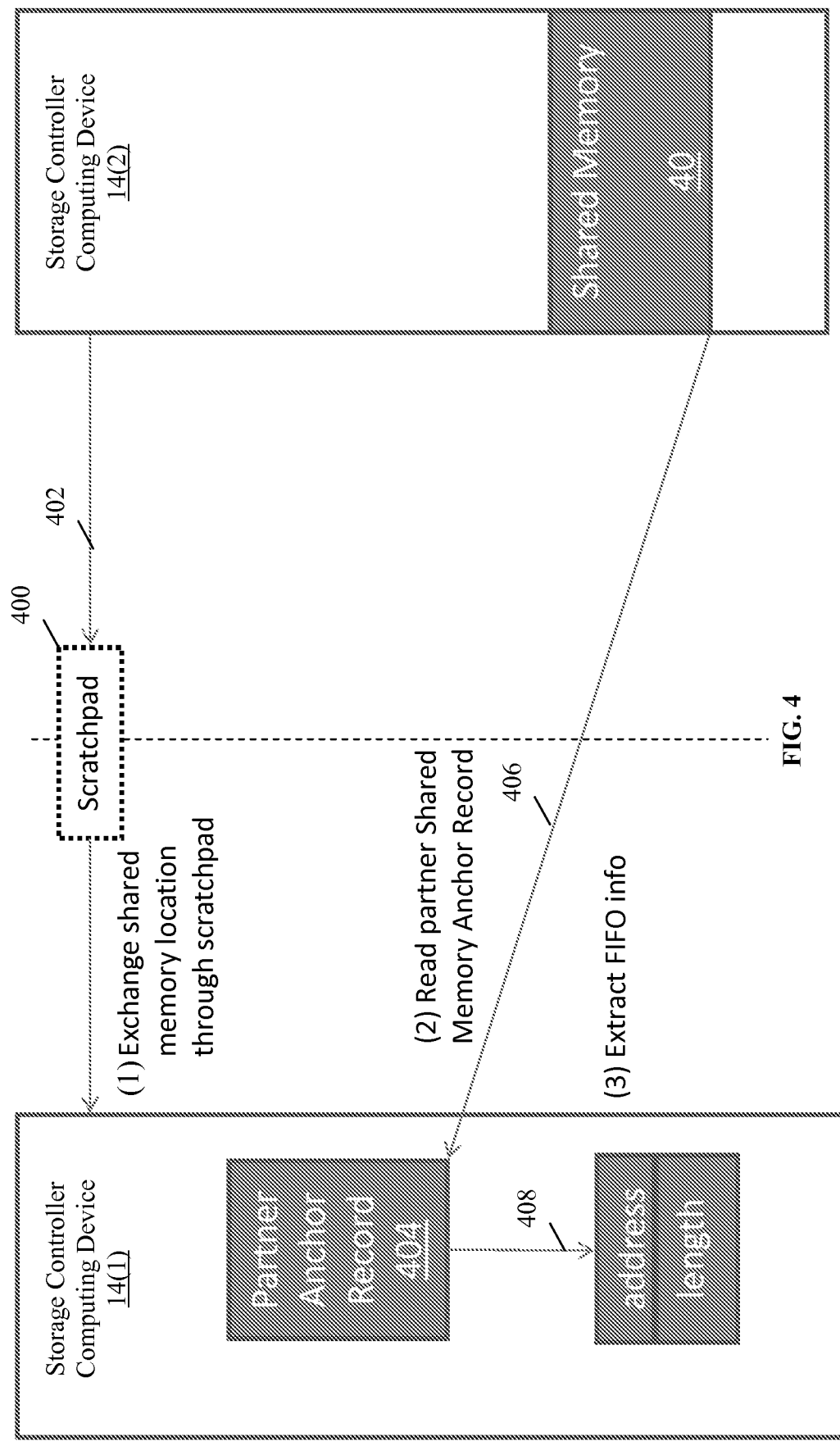
FIG. 4 is a flow diagram of an exemplary method for advertising shared memory and configuration information in order to facilitate DMA transfers between the storage controller computing devices.

Referring more specifically to FIG. 4, an exemplary method for configuring the RDMA plug-in driver 42 in step 300 in order to facilitate DMA transfers between the storage controller computing devices 14(1) and 14(2) is illustrated. In step 400 in this example, a scratchpad register 402 provided by the DMA provider device 32 is used to facilitate advertisement of the location of the anchor record 404 in the shared memory 40 by the peer storage controller computing device 14(2), and corresponding discovery of the anchor record 404 by the storage controller computing device 14(1), although other methods for advertising the anchor record 404 can also be used.

In step 406, the storage controller computing device 14(1) retrieves the anchor record 404 from the shared memory 40 of the peer storage controller computing device 14(2) via DMA and based on the location obtained in step 400. In step 408, the storage controller computing device 14(1) extracts information regarding a message FIFO memory region of the shared memory 40 of the peer storage controller computing device 14(2). In this example, the storage controller computing device 14(1) also extracts other configuration information from the anchor record 404 including information regarding a memory protection table region of the shared memory 40 of the peer storage controller computing device 14(2), for example.

With the memory protection table region information, the storage controller computing device 14(1) can retrieve a memory protection table from the peer storage controller computing device 14(2), and store the memory protection table in local memory 28, as described and illustrated in more detail later. In some examples, an administrator can establish the shared memory 40 of the peer storage controller computing device 14(2) by defining the message FIFO memory region and memory protection table region, and storing the definitions and other information in the anchor record 404, for example.

Figure 5:
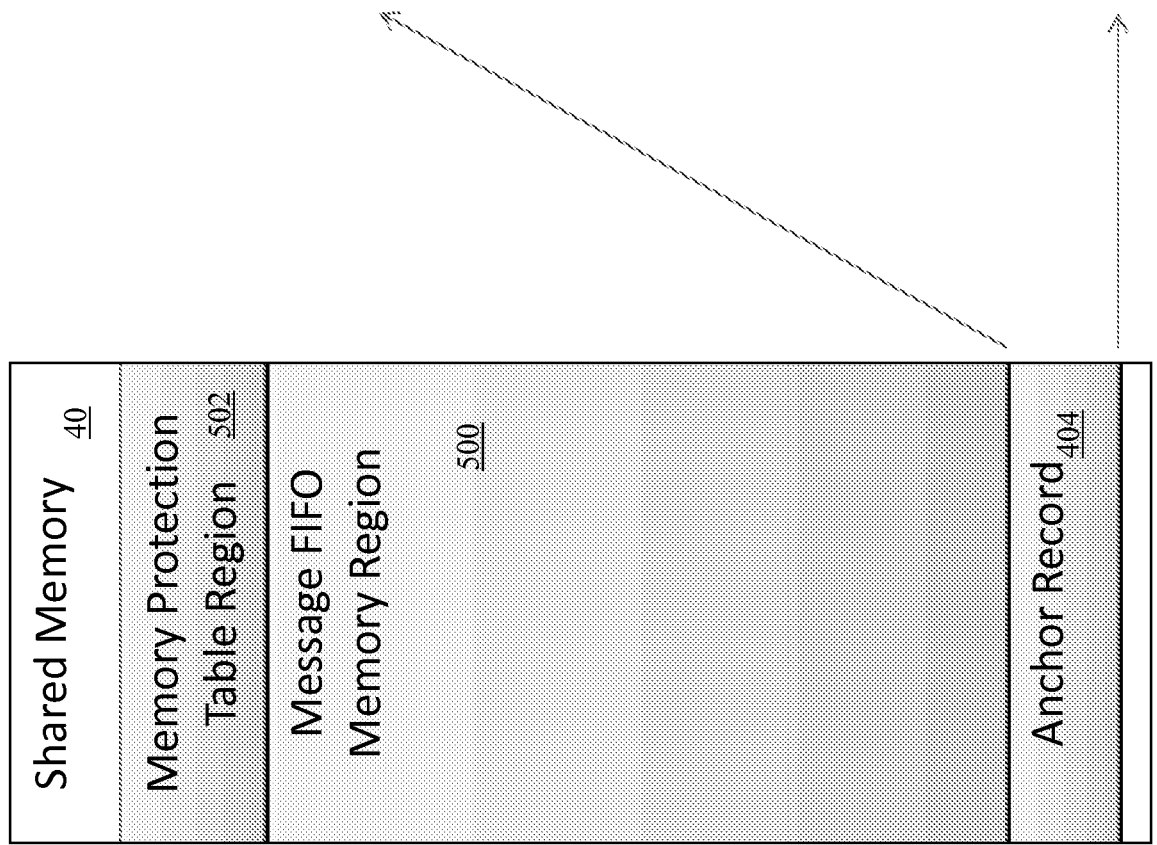
FIG. 5 is a block diagram of an exemplary shared memory of one of the storage controller computing devices including a memory protection table region, a message FIFO memory region, and an anchor record.

Referring more specifically to FIG. 5, an exemplary shared memory 40 of the peer storage controller computing device 14(2) including a message FIFO memory region 500, a memory protection table region 502, and the anchor record 404 is illustrated. In this example, the anchor record 404 defines the message FIFO memory region 500 and memory protection table region 502 based on a size and offset. The message FIFO memory region 500 of the shared memory 40 stores intermediate buffers used to receive network messages. Accordingly, by obtaining the anchor record 404 defining the message FIFO memory region 500, the storage controller computing device 14(1) discovers the portion of the shared memory 40 of the peer storage controller computing device 14(1) that is available for placing network messages via DMA, as described and illustrated in more detail later.

Additionally, the memory protection table region 502 of the shared memory 40 in this example stores addresses in the memory 48 that can be used to read or write data. Accordingly, by obtaining the anchor record 404 defining the memory protection table region 502, the storage controller computing device 14(1) discovers addresses in the memory 28 of the peer storage controller computing device 14(2) from which the storage controller computing device 14(1) can read data from via RDMA, and to which the storage controller computing device 14(1) can write data via RDMA, as described and illustrated in more detail later.

Referring back to FIG. 3, in step 302, the RDMA plug-in driver 42 of the storage controller computing device 14(1) obtains a work request from a send or a receive queue. The work request was previously submitted by one of the client application(s) 36 using the OFED verbs API in this example, although other APIs can be used in other examples. Accordingly, one of the client application(s) 36 submit work request via the OFED verbs API that are placed in a send or receive queue of a queue pair corresponding to the context associated with the one of the client application(s) 36, as described and illustrated in more detail later.

In step 304, the RDMA plug-in driver 42 of the storage controller computing device 14(1) determines a type of the work request. The work request can be one of many different types of requests including a request to send a network message, a request to receive a network message, an RDMA write request to write data directly to the memory 28 of the peer storage controller computing device 14(2), or an RDMA read request to read data directly from the memory 28 of the peer storage controller computing device 14(2), for example.

In step 306, the RDMA plug-in driver 42 of the storage controller computing device 14(1) processes the work request based on the type of work request and using DMA and the DMA provider device 32. While the DMA provider device 32 does not support network messages that facilitate establishing channels and other operations, the RDMA plug-in driver 42, which is between the OFED stack API and the DMA provider device 32, advantageously supports sending and receiving of network messages using DMA and the DMA provider device 32, as described and illustrated in more detail later with reference to FIGS. 6-9. Additionally, the RDMA plug-in driver 42 of the storage controller computing device 14(1) processes RDMA write and read requests, as described and illustrated in more detail later with reference to FIGS. 10-12.

Figure 6:
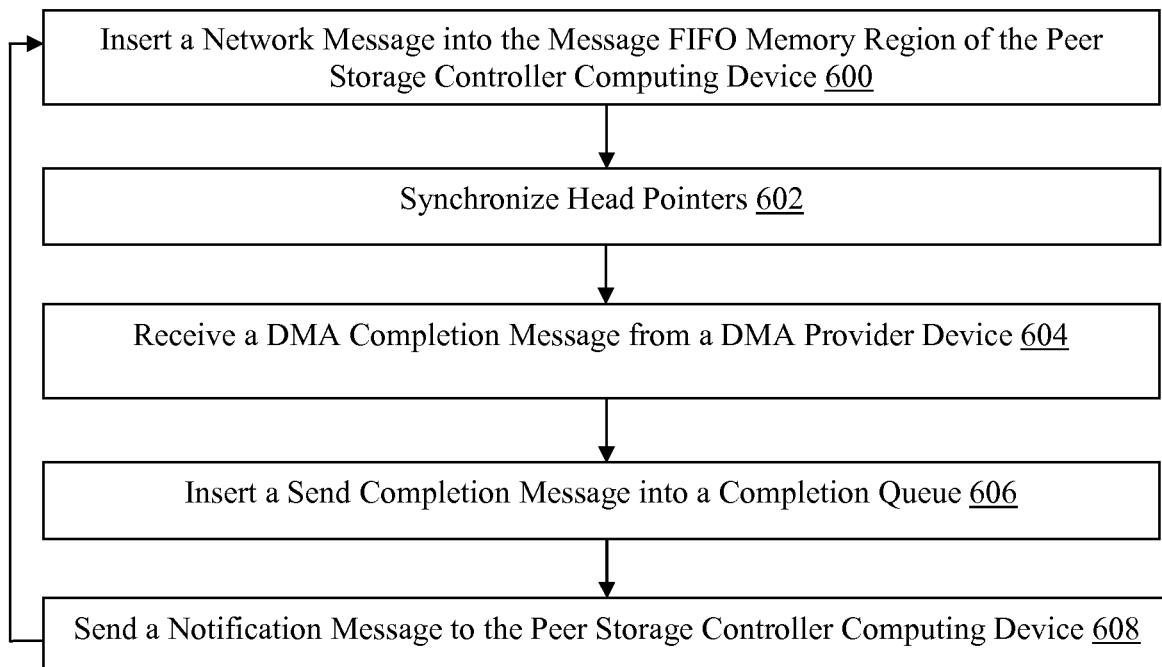
FIG. 6 is a flowchart of an exemplary method for processing work requests including a request to send a network message to a peer one of the storage controller computing devices.

Referring more specifically to FIG. 6, an exemplary method for processing a work request of a request to send a network message type is illustrated. In step 600, the RDMA plug-in driver 42 of the storage controller computing device 14(1) instructs the DMA provider device 32 to insert a network message into the message FIFO memory region 500 of the shared memory 40 of the peer storage controller computing device 14(2). The network message was obtained as described and illustrated earlier with reference to step 302 of FIG. 3. Additionally, the location of the message FIFO memory region 500 of the shared memory 40 of the peer storage controller computing device 14(1) was determined from a retrieved anchor record, as described earlier with reference to step 300 of FIG. 3 and step 402 of FIG. 4.

Referring more specifically to FIG. 7, an exemplary method for processing work requests of requests to send and receive network message types is illustrated. In this particular example, a send request buffer posted by one of the client application(s) 36 using the OFED verbs API is retrieved from a send queue for the context associated with the one of the client application(s) 36. Additionally, a head pointer identifying a specific location in the message FIFO memory region 500(2) of the peer storage controller computing device 14(2) is maintained by the storage controller computing device 14(1) and used to identify the location at which the network message should be inserted.

Figure 8:
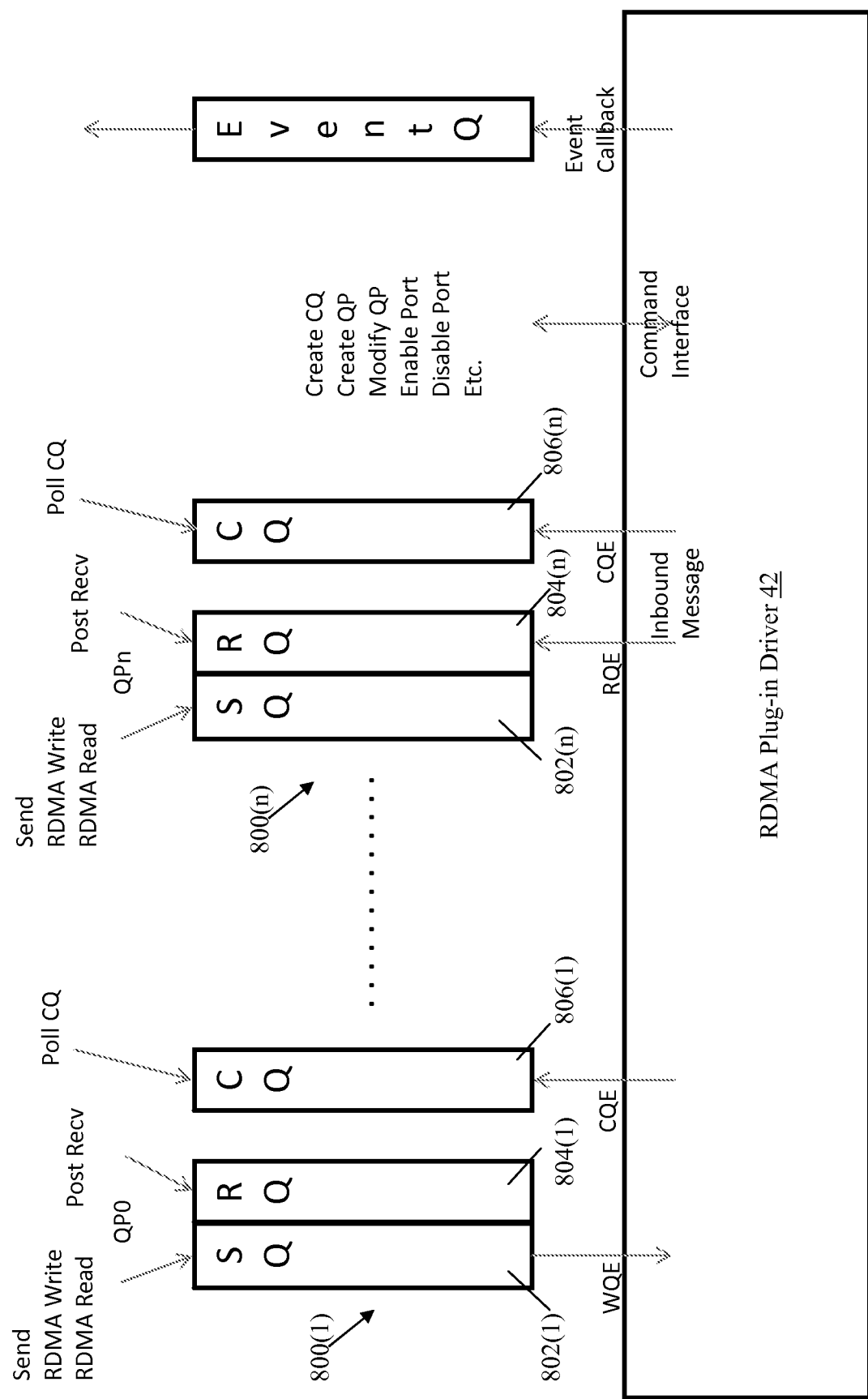
FIG. 8 is a block diagram of an exemplary set of queues managed by the RDMA plug-in driver of one of the storage controller computing devices.

Referring more specifically to FIG. 8, an exemplary set of queues managed by the RDMA plug-in driver 42 of the storage controller computing device 14(1) is illustrated. In this example, the RDMA plug-in driver 42 maintains queue pairs 800(1)-800(n) that include send queues 802(1)-802(n), receive queues 804(1)-804(n), and completion queues 806(1)-806(n). The send queues 802(1)-802(n) are used to buffer or hold work requests submitted by the client application(s), as described and illustrated earlier. The receive queues 804(1)-804(n) in this example are used to receive network messages sent from the peer storage controller computing device 14(n) via DMA, as described and illustrated later with reference to FIG. 9. Additionally, the completion queues 806(1)-806(n) in this example are used to report success or failure of a work request, as described and illustrated in more detail later.

Referring back to FIG. 6, in step 602, the RDMA plug-in driver 42 of the storage controller computing device 14(1) synchronizes the head pointers, including the local head pointer for the message FIFO memory region 500(2) and the remote head pointer for the message FIFO memory region 500(2) stored by the peer storage controller computing device 14(2). The head pointers are also synchronized via a DMA message sent using the DMA provider device 32 to the peer storage controller computing device 14(2). In this example, the DMA message synchronizing the head pointers can be the DMA message that includes the network message and inserts the network message into the message FIFO memory region 500(2) of the peer storage controller computing device 14(2). In another example, the DMA message synchronizing the head pointers can be a separate DMA message, and other methods for synchronizing the head pointers can also be used.

By synchronizing the head pointers both storage controller computing devices 14(1) and 14(2) can determine the location(s) in the message FIFO memory region 500(2) that is currently utilized to maintain or buffer current network messages that have not yet been processed by the peer storage controller computing device 14(2). Additionally, the synchronization allows the storage controller computing device 14(1) to determine the location in the message FIFO memory region 500(2) that can be used to insert a next network message.

In step 604, the RDMA plug-in driver 42 of the storage controller computing device 14(1) receives a DMA completion message from the DMA provider device 32. In example in which multiple DMA message are required to insert the network message and synchronize the head pointer, multiple DMA completion messages may be received from the DMA provider device 32.

In step 606, the RDMA plug-in driver 42 of the storage controller computing device 14(1) inserts a send completion message into one of the completion queues 806(1)-806(n) for the context corresponding to the one of the client applications 36(1). The completion message can indicates a success or failure of the sending of the network message based on the DMA completion message, for example. In step 608, the RDMA plug-in driver 42 of the storage controller computing device 14(1) sends a notification message to the peer storage controller computing device 14(2) using the DMA provider device 32 in order to initiates a receive process at the peer storage controller computing device 14(2).

Figure 9:
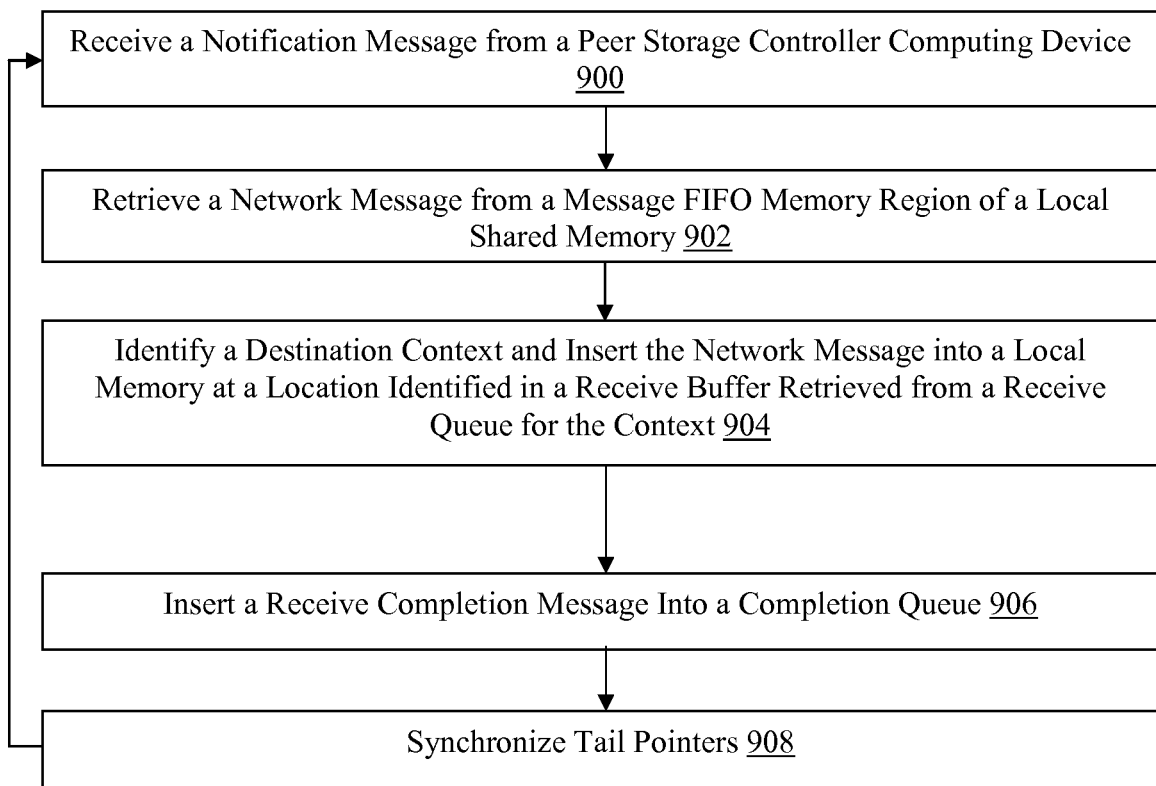
FIG. 9 is a flowchart of an exemplary method for processing a network message received from a peer one of the storage controller computing devices.

Referring more specifically to FIG. 9, an exemplary method for processing a work request of a receive network message type. In step 900, the RDMA plug-in driver 42 of the storage controller computing device 14(1) receives a notification message from the peer storage controller computing device 14(1) and via the DMA provider device 32. Accordingly, in this example, the peer storage controller computing device 14(2) inserted a network message into the message FIFO memory region 500(1) of the storage controller computing device 14(1), and sent a notification message to the RDMA plug-in driver 42 of the storage controller computing device 14(1), as described and illustrated earlier with reference to FIG. 6.

In step 902, the RDMA plug-in driver 42 of the storage controller computing device 14(1) retrieves the network message from the message FIFO memory region 500(1) in response to the notification message received in step 900. In step 904, the RDMA plug-in driver 42 of the storage controller computing device 14(1) identifies a destination context associated with one of the client application(s) 36, based on information included in the network message or the notification message. In step 904, the RDMA plug-in driver 42 also inserts the network message into a local memory 28 at a location identified in a receive buffer retrieved from one of the receive queues 804(1)-804(n) corresponding to the context. The receive buffer was previously posted by one of the client application(s) 36.

In step 906, the RDMA plug-in driver 42 of the storage controller computing device 14(1) inserts a receive completion message into one of the completion queues 806(1)-806(n) indicating that the network message has been received for the context. Additionally, in step 908, the RDMA plug-in driver 42 of the storage controller computing device 14(1) also synchronizes the local and remote tail pointers between the storage controller computing devices 14(1) and 14(2) based on the removal of the network message from the message FIFO memory region 500(1).

Figure 10:
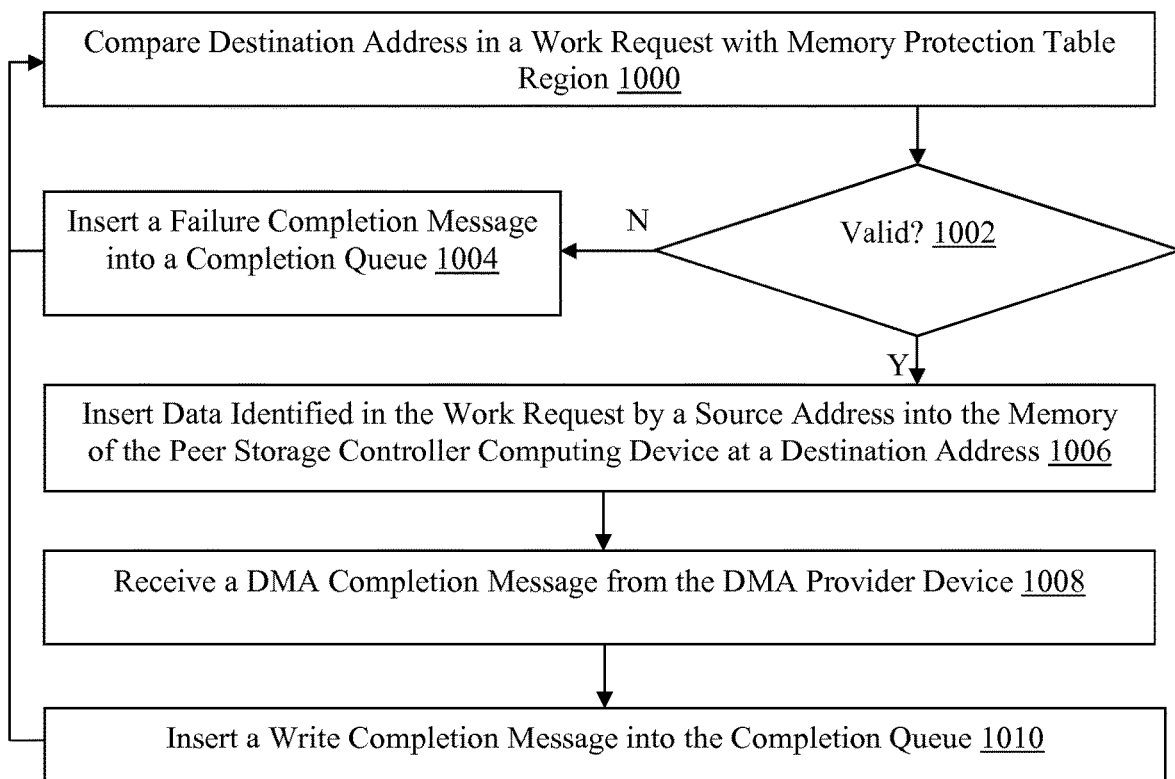
FIG. 10 is a flowchart of an exemplary method for processing a write RDMA work request by one of the storage controller computing devices.

Referring more specifically to FIG. 10, an exemplary method for processing a write RDMA work request by the storage controller computing device 14(1) is illustrated. In step 1000 in this example, the RDMA plug-in driver 42 of the storage controller computing device 14(1) compares a destination address in a work request with a memory protection table 1108 of the storage controller computing device 14(1) previously obtained as described and illustrated earlier with reference to step 300 of FIG. 3. The work request can be obtained from one of the send queues 802(1)-802(n), as described and illustrated earlier with reference to step 302 of FIG. 3, for example.

Figure 11:
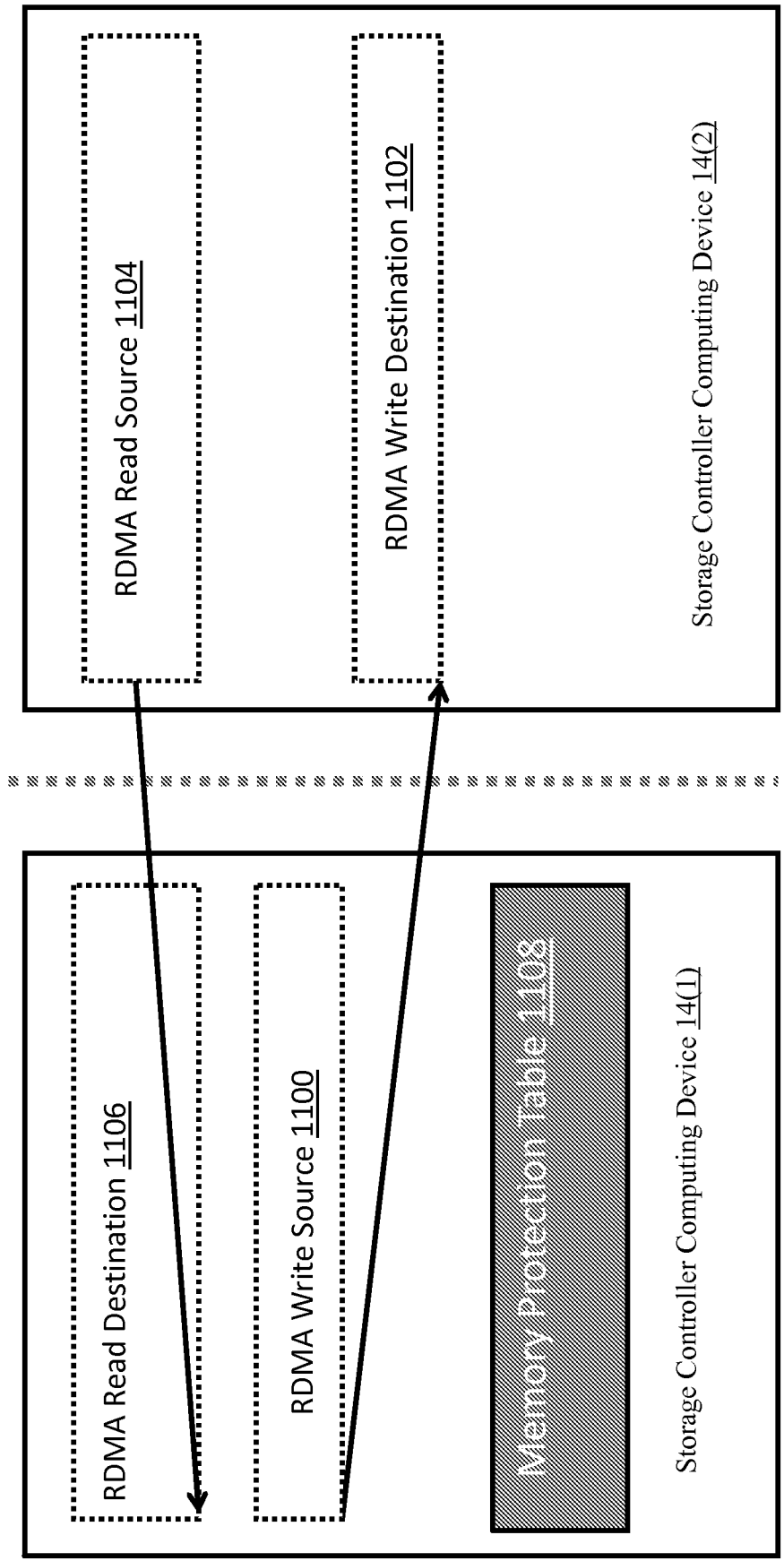
FIG. 11 is a flow diagram of an exemplary method for processing write and read RDMA work requests by the storage controller computing devices.

Referring more specifically to FIG. 11, a flow diagram of an exemplary method for processing write and read RDMA work requests by the storage controller computing devices 14(1) is illustrated. In this example, the RDMA write work request obtained by the storage controller computing device 14(1) includes an indication of a source address 1100 in the memory 28 of the storage controller computing device 14(1) and a destination address 1102 that, if valid, corresponds with the memory protection table 1108 in the storage controller computing device 14(1).

As described and illustrated earlier, the memory protection table 1100 identifies locations in the shared memory 40 of the peer storage controller computing device 14(2) that are available for writing (and reading) data by the storage controller computing device 14(1). Accordingly, the source address 1108 and destination address 1102 are included in the work request by one of the client application(s) 36 from which the work request originated.

Accordingly, in step 1002, the RDMA plug-in driver 42 of the storage controller computing device 14(1) determines whether the destination address is valid based on the comparison in step 1000. If the RDMA plug-in driver 42 determines that the destination address is not valid, then the No branch is taken to step 1204. In step 1004, the RDMA plug-in driver 42 of the storage controller computing device 14(1) inserts a failure completion message into one of the completion queues 806(1)-806(n). However, if the RDMA plug-in driver 42 determines that the destination address is valid, then the Yes branch is taken to step 1006.

In step 1006, the RDMA plug-in driver 42 of the storage controller computing device 14(1) instructs the DMA provider device 32 to insert data identified in the work request by the source address 1100 into the destination address 1102 that is identified in the work request and is within the memory protection table 1108. Accordingly, the RDMA write work request is processed by the RDMA plug-in driver 42 of the storage controller computing device 14(1) by writing, via DMA and using the DMA Provider device 32, directly into the shared memory 40 of the peer storage controller computing device 14(2) and without the intermediate buffering required to facilitate the exchange of network messages.

In step 1008, the RDMA plug-in driver 42 of the storage controller computing device 14(1) receives a DMA completion message from the DMA provider device 32. In step 1010, the RDMA plug-in driver 42 of the storage controller computing device 14(1) inserts a write completion message into one of the completion queues 806(1)-806(n).

Figure 12:
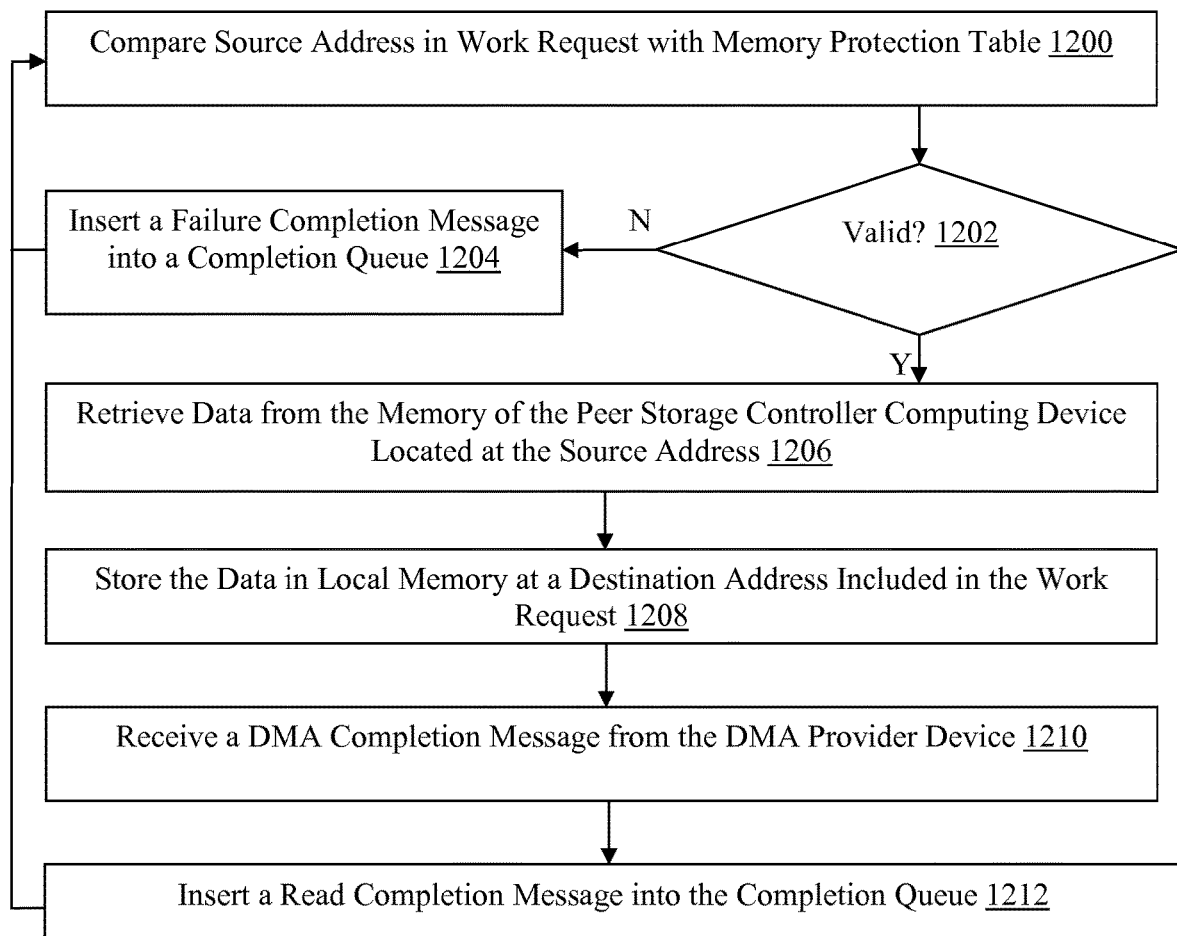
FIG. 12 is a flowchart of an exemplary method for processing a read RDMA work request by one of the storage controller computing devices.

Referring more specifically to FIG. 12, an exemplary method for processing a read RDMA work request by one of the storage controller computing devices is illustrated. In step 1200 in this example, the RDMA plug-in driver 42 of the storage controller computing device 14(1) compares a source address in a work request with a memory protection table 1108 of the storage controller computing device 14(1). The work request can be obtained from one of the send queues 802(1)-802(n), as described and illustrated earlier with reference to step 302 of FIG. 3.

Referring back to FIG. 11, a the RDMA read work request obtained by the storage controller computing device 14(1) in this example includes an indication of a destination address 1106 in the memory 28 of the storage controller computing device 14(1) and a source address 1104 that, if valid, corresponds with the memory protection table region 502 in the shared memory 40 of the peer storage controller computing device 14(1). Accordingly, the source address 1106 and destination address 1104 are included in the work request by one of the client application(s) 36 from which the work request originated.

Accordingly, in step 1202, the RDMA plug-in driver 42 of the storage controller computing device 14(1) determines whether the source address is valid based on the comparison in step 1200. If the RDMA plug-in driver 42 determines that the source address is not valid, then the No branch is taken to step 1204. In step 1204, the RDMA plug-in driver 42 of the storage controller computing device 14(1) inserts a failure completion message into one of the completion queues 806(1)-806(n). However, if the RDMA plug-in driver 42 determines that the source address is valid, then the Yes branch is taken to step 1206.

In step 1206, the RDMA plug-in driver 42 of the storage controller computing device 14(1) instructs the DMA provider device 32 to insert data identified in the work request by the source address 1104, and is within the memory protection table 1108 of the peer storage computing device 14(2), into the destination address 1106 that is identified in the work request. Accordingly, the RDMA read work request is processed by the RDMA plug-in driver 42 of the storage controller computing device 14(1) by retrieving, via DMA and using the DMA Provider device 32, data directly from the shared memory 40 of the peer storage controller computing device 14(2) and without the intermediate buffering required to facilitate the exchange of network messages.

In step 1208, the RDMA plug-in driver 42 of the storage controller computing device 14(1) receives a DMA completion message from the DMA provider device 32. In step 1210, the RDMA plug-in driver 42 of the storage controller computing device 14(1) inserts a read completion message into one of the completion queues 806(1)-806(n).

Accordingly, with this technology, RDMA services can be provided for client applications utilizing the OFED API without rewriting of the applications and without requiring specialized hardware or any specific transport protocol. Accordingly, this technology allows system (e.g., storage controller computing device) designers to use generic DMA provider devices (e.g., non-transparent bridges) in order to carry out RDMA transactions for applications. In particular, the RDMA plug-in driver of this technology is disposed between the OFED API and the device driver for a generic DMA provider device, and implements network messaging and other RDMA services that would not otherwise be supported. Therefore, this technology allows system designers to select from an increased number of relatively less costly devices for OFED RDMA applications.

Having thus described the basic concept of the invention, it will be rather apparent to those skilled in the art that the foregoing detailed disclosure is intended to be presented by way of example only, and is not limiting. Various alterations, improvements, and modifications will occur and are

What is claimed is:

1. A method, comprising:
   storing, by a first computing device, a first network message into a first location of a remote memory region of a second computing device via direct memory access (DMA), wherein the remote memory region is defined in an anchor record retrieved from a shared memory of the second computing device;
   synchronizing, by the first computing device and via DMA, a local head pointer with a remote head pointer stored by the second computing device, wherein the local and remote head pointers correspond to the first location; and
   sending, by the first computing device and via DMA, a notification message to the second computing device indicating that the network message has been transferred following receipt of a DMA completion message.

2. The method of claim 1, further comprising obtaining, by the first computing device and from a queue, a work request to send the first network message, wherein the work request is inserted into the queue by a client application using an OpenFabrics Enterprise Distribution (OFED) application programming interface (API).

3. The method of claim 1, further comprising inserting, by the first computing device, a send completion message into a completion queue following receipt of the DMA completion message.

4. The method of claim 1, further comprising inserting, by the first computing device, a second network message into a second location in a local memory, wherein the second network message is obtained from a local memory region following receipt of a second notification message from the second computing device.

5. The method of claim 4, further comprising inserting, by the first computing device, a receive completion message into a completion queue following insertion of the second network message into the second location in the local memory.

6. The method of claim 4, further comprising synchronizing, by the first computing device and via DMA, a local tail pointer with a remote tail pointer stored by the second computing device, wherein the local and remote tail pointers correspond to the second location.

7. A non-transitory machine readable medium having stored thereon instructions for enabling direct memory access (DMA) capable devices for remote DMA (RDMA) comprising machine executable code which when executed by at least one machine causes the machine to:
   insert a first network message into a first location of a remote memory region of a computing device via DMA, wherein the remote memory region is defined in an anchor record retrieved from a shared memory of the computing device;
   synchronize, via DMA, a local head pointer with a remote head pointer stored by the computing device, wherein the local and remote head pointers correspond to the first location; and
   send, via DMA, a notification message to the computing device indicating that the network message has been transferred following receipt of a DMA completion message.

8. The non-transitory machine readable medium of claim 7, wherein the machine executable code when executed by the machine further causes the machine to obtain, from a queue, a work request to send the first network message, wherein the work request is inserted into the queue by a client application using an OpenFabrics Enterprise Distribution (OFED) application programming interface (API).

9. The non-transitory machine readable medium of claim 7, wherein the machine executable code when executed by the machine further causes the machine to insert a send completion message into a completion queue following receipt of the DMA completion message.

10. The non-transitory machine readable medium of claim 7, wherein the machine executable code when executed by the machine further causes the machine to insert a second network message into a second location in a local memory, wherein the second network message is obtained from a local memory region following receipt of a second notification message from the computing device.

11. The non-transitory machine readable medium of claim 10, wherein the machine executable code when executed by the machine further causes the machine to insert a receive completion message into a completion queue following insertion of the second network message into the second location in the local memory.

12. The non-transitory machine readable medium of claim 10, wherein the machine executable code when executed by the machine further causes the machine to synchronize, via DMA, a local tail pointer with a remote tail pointer stored by the computing device, wherein the local and remote tail pointers correspond to the second location.

13. A first computing device, comprising:
   a memory containing machine readable medium comprising machine executable code having stored thereon instructions for enabling direct memory access (DMA) capable devices for remote DMA (RDMA); and
   a processor coupled to the memory, the processor configured to execute the machine executable code to cause the processor to:
      insert a first network message into a first location of a remote memory region of a second computing device via DMA, wherein the remote memory region is defined in an anchor record retrieved from a shared memory of the second computing device;
      synchronize, via DMA, a local head pointer with a remote head pointer stored by the second computing device, wherein the local and remote head pointers correspond to the first location; and
      send, via DMA, a notification message to the second computing device indicating that the network message has been transferred following receipt of a DMA completion message.

14. The first computing device of claim 13, wherein the processor is further configured to execute the machine executable code to further cause the processor to obtain, from a queue, a work request to send the first network message, wherein the work request is inserted into the queue by a client application using an OpenFabrics Enterprise Distribution (OFED) application programming interface (API).

15. The first computing device of claim 13, wherein the processor is further configured to execute the machine executable code to further cause the processor to insert a send completion message into a completion queue following receipt of the DMA completion message.

16. The first computing device of claim 13, wherein the processor is further configured to execute the machine executable code to further cause the processor to insert a second network message into a second location in a local memory, wherein the second network message is obtained from a local memory region following receipt of a second notification message from the second computing device.

17. The first computing device of claim 16, wherein the processor is further configured to execute the machine executable code to further cause the processor to insert a receive completion message into a completion queue following insertion of the second network message into the second location in the local memory.

18. The first computing device of claim 16, wherein the processor is further configured to execute the machine executable code to further cause the processor to synchronize, via DMA, a local tail pointer with a remote tail pointer stored by the second computing device, wherein the local and remote tail pointers correspond to the second location.

* * * * *